(12) United States Patent
Leech

(10) Patent No.: US 10,905,091 B2
(45) Date of Patent: Feb. 2, 2021

(54) LITTER SCOOPING RECEPTACLE

(71) Applicant: James Leech, Richmond (CA)

(72) Inventor: James Leech, Richmond (CA)

(*) Notice: Subject to any disclaimer, the term of this patent is extended or adjusted under 35 U.S.C. 154(b) by 115 days.

(21) Appl. No.: 16/268,849

(22) Filed: Feb. 6, 2019

(65) Prior Publication Data
US 2020/0245587 A1 Aug. 6, 2020

(51) Int. Cl.
*A01K 1/01* (2006.01)
(52) U.S. Cl.
CPC .................... *A01K 1/011* (2013.01)
(58) Field of Classification Search
CPC .... A01K 1/011; A01K 1/0107; A01K 1/0114; A01K 1/01
USPC .................. 119/166, 161, 165, 168
See application file for complete search history.

(56) References Cited

U.S. PATENT DOCUMENTS

| | | | | | |
|---|---|---|---|---|---|
| 4,190,525 A | * | 2/1980 | Menzel | ................ | A01K 1/0114 119/166 |
| 4,574,735 A | * | 3/1986 | Hohenstein | .......... | A01K 1/0114 119/163 |
| 4,846,104 A | * | 7/1989 | Pierson, Jr. | .......... | A01K 1/0114 119/166 |
| 5,048,465 A | * | 9/1991 | Carlisi | ................ | A01K 1/011 119/161 |
| 5,226,388 A | * | 7/1993 | McDaniel | ............ | A01K 1/0114 119/166 |
| 5,259,340 A | * | 11/1993 | Arbogast | ............ | A01K 1/0114 119/165 |
| 5,823,137 A | * | 10/1998 | Rood | .................. | A01K 1/0114 119/166 |
| 6,286,459 B1 | * | 9/2001 | Parr | .................... | A01K 1/0114 119/163 |
| 6,568,348 B1 | * | 5/2003 | Bedard | ................ | A01K 1/0114 119/166 |
| 2005/0235920 A1 | * | 10/2005 | Brokaski | ............. | A01K 1/0114 119/166 |
| 2012/0210943 A1 | * | 8/2012 | Omps | .................. | A01K 1/0114 119/166 |

* cited by examiner

*Primary Examiner* — Justin M Jonaitis

(57) ABSTRACT

One embodiment of a scooping litter receptacle, which forms a compact cylindrical exterior design, contains a scoop device that can pivot within the base container which has a curved inner surface with no sharp corners or edges. The scoop is able to pass through the entire bed of litter granules in less than half a rotational turn, thus, separating waste material usable litter. The scoop can then be lifted from the litter receptacle by the handles so that the complete scooping process can be done by the user without the user coming into contact with parts that have traversed through the soiled litter mass. Also, the scoop device is not fixed to the base container which makes it easy to remove and discard the waste as well to remove for cleaning. Further, the base container is designed such that the scoop device can be stored inside the litter receptacle. An optional top cover allows for the litter receptacle to be enclosed which helps reduce litter tracking outside the litter receptacle as well as providing a compact and tidy appearance.

11 Claims, 16 Drawing Sheets

LITTER SCOOPING RECEPTACLE

CROSS-REFERENCE TO RELATED APPLICATIONS

The present application claims priority to U.S. Provisional Patent Application Ser. No. 62/686,513, filed on Jun. 18, 2018, the disclosure of which is hereby incorporated in its entirety at least by reference.

BACKGROUND OF THE INVENTION

1. Field of the Invention

The present invention relates to cat litter apparatus, and more particularly, to an easy cleaning and efficient sifting litter box system.

2. Description of Related Art

Traditionally, indoor cats are trained to use a litter box for performing their bodily functions. The typical litter box consists of a container made from a material such as plastic, which holds granular absorbent material called litter. Many forms of litter clump when absorbing liquids, thus containing the urine in clump form. To maintain a clean litter box as well as reduce unpleasant odors, it is necessary to frequently separate and dispose of the urine clumps and fecal matter from the usable litter. This task is seen most often as unpleasant and thus, many devices have been developed to automate the process.

A common method that has been invented to make cleaning a litter box an easier task is gravitational sifting. Two different automated sifting methods have been disclosed in U.S. Pat. Nos. 7,647,889 and 6,463,881 where the container holding the litter is rotated such that the clean litter will flow with gravity through a screen that separates small litter granules from the larger waste excreta. Sifting systems such as these have some disadvantages. The method of displacing all the litter through a screen causes soiled litter dust to be raised into the air; further to this, the volatile action of displacing all the litter through a screen often causes softer litter clumps to break apart into small pieces and thus rendering the sifting screen unable to separate these smaller pieces from usable litter. Another disadvantage is the extra added screens and components, which provide ideal locations for bacteria to grow. Further to this, the extra components add bulkiness to the litter system increasing the footprint inside your home and often these units are very expensive.

Another self-cleaning litter method is raking. U.S. Pat. No. 9,526,226 describes a rectangular litter box which uses a motorized rake to extract waste from the litter. There are some disadvantages related to such raking systems. Only certain litter types that sift easily can be used in these systems. The rake horizontally traverses the litter bed and litters that are more difficult to sift form a wave in front of the rake resisting the sifting process. Further to this, cats frequently urinate on the edges of litter systems and in my observation, these systems tend to clog and jam under such circumstances where a clump is formed in key areas along edges and corners.

In U.S. Pat. No. 4,190,525 a litter receptacle is formed with end walls and a curved bottom surface. A sifting screen is mounted to a crank system which lets the user rotate a screen through the litter. This is an interesting design but in my experiences I have observed several disadvantages. The edges between the sidewall and curved bottom form corners and clumps formed in these corners are difficult to remove from this process alone. Typically, clumps in corners such as these tend to smear along the container walls. Another disadvantage is the way the crank mechanism is mounted. The crank, crankpin and handle are fixed to the container while the scoop screen is removable. This means after the scooping cycle is complete the user must handle the scoop screen which has been in contact with fecal matter. A most unpleasant and unsanitary task. To add, because the crankpin is fixed, the design is made so the crank rotates 360 degrees starting from above the litter level, then rotating roughly 180 degrees to enter the body of litter and then roughly another 180 degrees to return to starting position. An issue arises here as the scoop screen reaches the top edge of the container, as any litter being pushed upwards along the containers curved wall or resting on the edges of the scoop screen will be pushed over the containers edge.

BRIEF SUMMARY OF THE INVENTION

There are three main objectives this invention intends to fill. The first is to effectively and reliably sift the entire litter material in one pass. The second objective of this invention is to shrink the design footprint of self-scooping or easy cleaning litter boxes to allow for aesthetically pleasing and compact litter box designs. The last objective of this invention is to create a receptacle that will function with both an open container design as well as a top cover that can be used to contain litter and odor within the litter receptacle.

The present disclosure provides a litter box design that efficiently filters waste material in a simple compact design. The litter box container includes a base unit which holds a mass of litter and a removable scoop device that can rotate inside the base unit. The scoop device has handles are on one end, and a filtering grate on the other end, with a pivot point in between said handle and grate.

The inner surfaces of the base container are curved and formed with no sharp edges or corners, and this surface holds a mass of litter. The inner surface is formed in a swept shape contouring the scoop device, such when the scoop device is rotatably mounted along an axis and rotated, the scoops perimeter maintains close contact with the containers inner surface through rotation along the containers surface areas that hold the mass of said litter. As the feline makes use of the device, the excreta are deposited throughout the mass of litter. A feature of this base unit is it has no sharp corners or edges and thus, there are limited areas for clumps to become lodged, stuck or smeared upon. The scoop device is designed such that it can be temporarily rotatably mounted in the litter container and then be fully detached to easily dispose of the separated excreta.

The scoop consists of a round shaft that can be pressed or rested into pivot slots on the container, and said scoop device rotates within this fixed point. The front edge of the scoop perfectly contours the inner surface so as the scoop travels through the litter receptacle its front edge will ensure that the scoop travels through all litter material in one pass. Further, a suitable sifting grate is attached to the scoop device such that as the scoop rotates through the mass of litter, the sifting grate will interact with all litter particles in the base container; effectively separating waste from usable litter in one pass.

As another feature of this invention, the sifting grate will form a cupped concave shape which will serve several benefits. The cupped shape allows the grate to lift instead of compress the litter particles as it first enters the mass of litter on the downward trajectory of the base containers curved walls. This will help the sifting grate sift through lighter litters as opposed to pushing said litter in a wave form in front of the sifting grate. Another benefit is the cupped grate will hold the waste mater which will allow easy and tidy removal and disposal as the complete scoop device in it's entirety is removable in one piece from the pivot slot. The scoop is a completely separate and removable entity but it is designed to complement the container and become fixed in the suitable pivot location allowing guided and precise rotation through the litter mass.

As another feature of this invention, the outer surface can be manufactured in a way that allows a top cover to slide over the base container and enclose the litter box. There are many benefits to an enclosed litter box, the main one being litter scatter control. The cover described in this invention will stack on top of the base container. This will allow the cover to secure onto the base unit. The feline will enter and exit the receptacle through an access hole on the cover's top surface. Upon exiting, the feline will climb out of the unit which will help remove litter particles from their paws, and keeping as much litter material as possible from spreading beyond the litter receptacle.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 4a-8a are cross sectional views of FIGS. 4-8. These cross section views illustrate operation in better clarity and detail.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a litter scooping receptacle.

Figure 1:
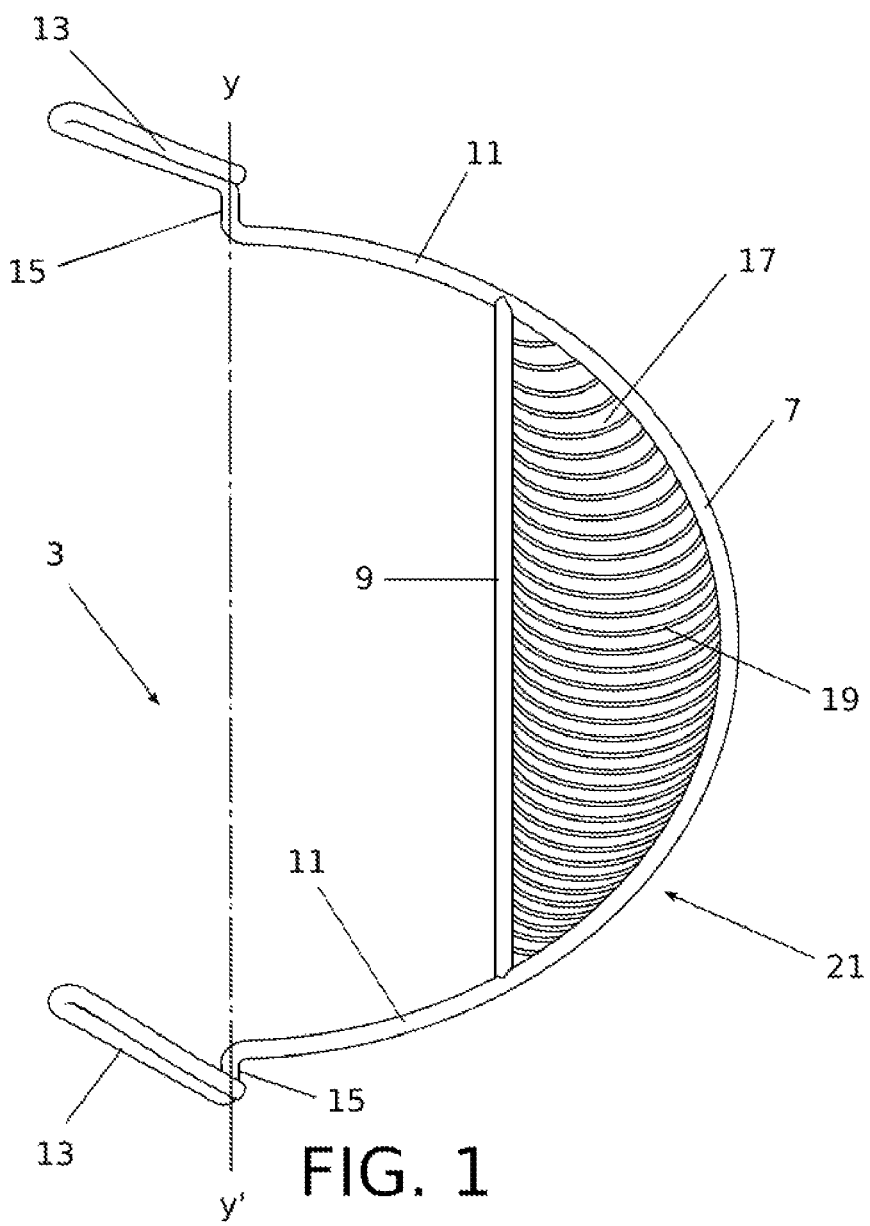
FIG. 1 depicts a perspective view of one embodiment of a scoop device.
Figure 11:
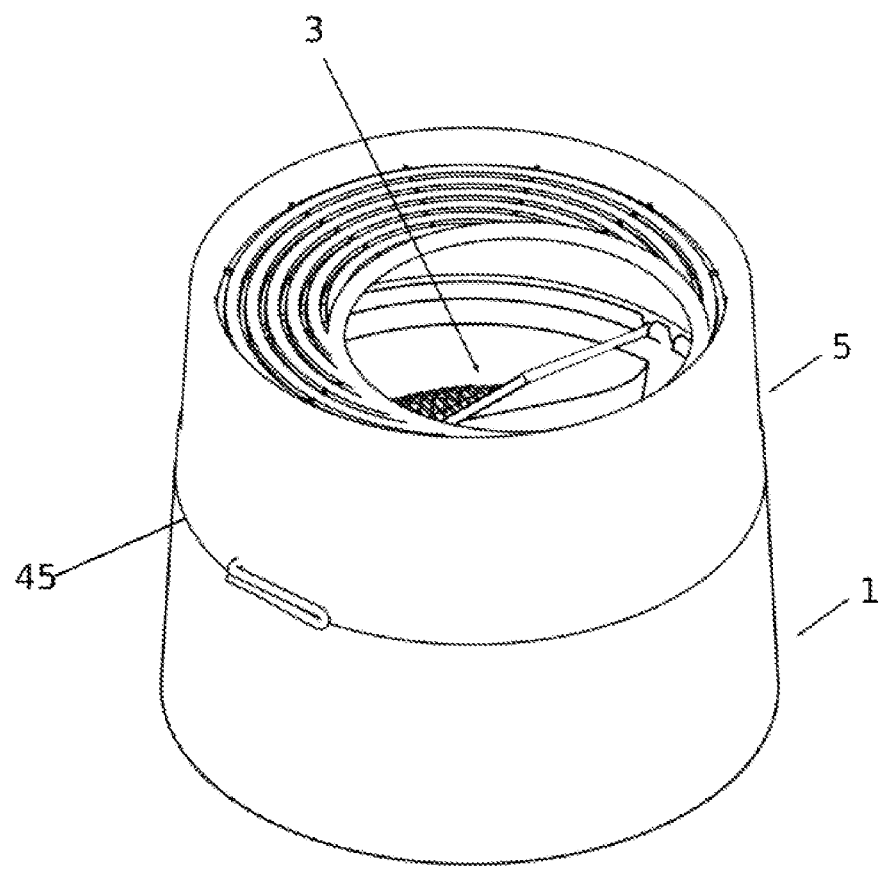
FIG. 11 depicts a perspective view of one embodiment of the assembled litter receptacle comprising of a scoop device, base container, and a top cover.

One embodiment of the litter receptacle is shown in FIG. 11 and comprises of a base container 1, scooping device 3, and top cover 5. Referring to FIG. 1 a scooping device 3 of this embodiment is depicted. The scoop device 3 is comprised of several components; a scooping profile 7, a cross bar 9, radial arms 11, handles 13, hinges 15 and sifting grate 17. The scooping profile 7 and the cross bar 9 form a perimeter where the sifting grate 17 is configured within. Said sifting grate 17 is comprised of several tines 19, arranged in a pattern that allow litter granules to pass through the sifting grate 17 while restricting waste excreta, thus, said sifting grate 17 is capable of separating waste excreta from a bed of litter granules. In this embodiment several tines 19 are arranged parallel to each other and attached perpendicularly from the cross bar 9 to the scooping profile 7. The sifting grate 17 forms a cupped shape capable of holding waste excreta after separation. The combination of scooping profile 7, cross bar 9, and sifting grate 17 will be referred to as the sifting scoop 21. Attached tangentially to the scooping profile 7 are the radial arms 11. The hinges 15 extend perpendicularly from the radial arms 11 and attach to the handles 13. The centerline of each hinge 15 is in alignment along a pivot y-y' axis on said scoop device 3. In this embodiment the scoop profile 7, radial arms 11, hinges 15 and handles 13 may all constructed from a singular piece of material, such as cold bending a metal round bar, or the scoop device 3 could be constructed from individual pieces securely attached together by welding or other suitable fasteners.

Figure 2:
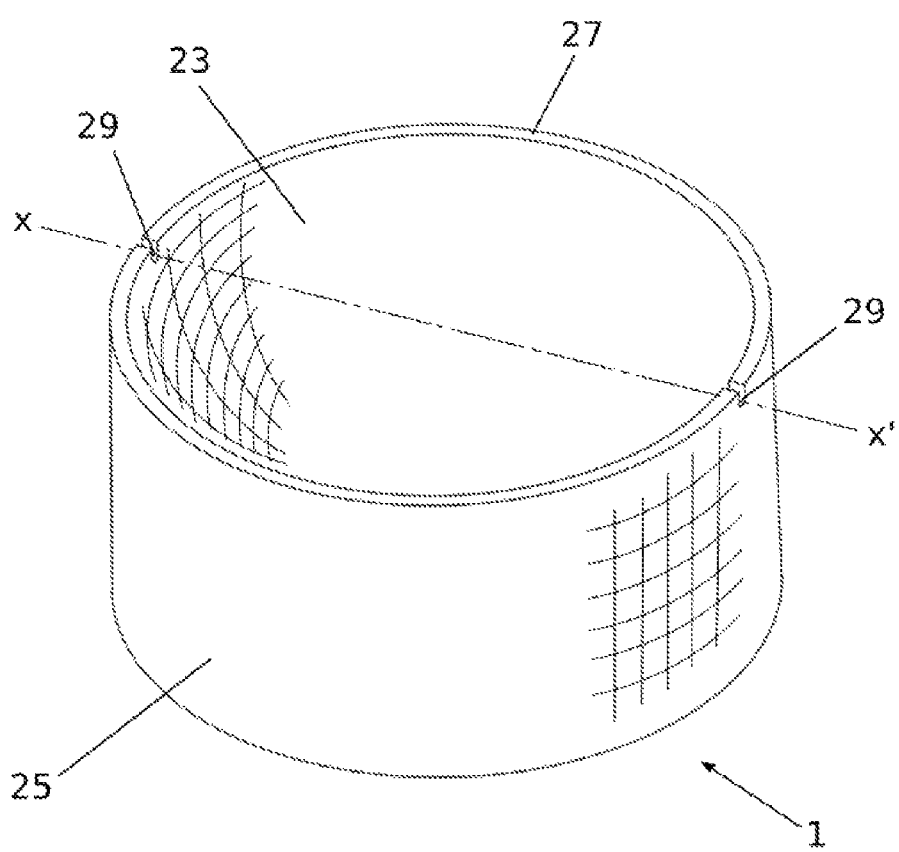
FIG. 2 depicts a perspective view of one embodiment of a base container.

Referring to FIG. 2 the base container 1 of this embodiment is illustrated and features a substantially hemispherical inner surface 23 with a substantially cylindrical outer wall 25. The inner surface 23 and outer wall 25 are attached along a top edge 27. In this embodiment said top edge 27 is at a height equal or greater than the radius of hemispherical inner surface 23. In this embodiment a suitable value for said radius could be 200-300 mm. Two pivot slots 29 form open apertures through the inner surface 23 and through the outer wall 25 as well as opening upwards through the top edge 27, forming an open slot; said pivot slots 29 are positioned antipodal about the center point of said hemispherical inner surface 23; the center points of each pivot slot 29 form a horizontal rotation x-x' axis. The base container 1 may be made of a plastic such as polypropylene, acrylonitrile butadiene styrene, polystyrene, or any of the numerous other similar plastics or even metals. Further, the base container of this embodiment may be manufactured using a several suitable methods, a few of which are plastic injection molding, thermoforming, or metal stamping.

Figure 3A:
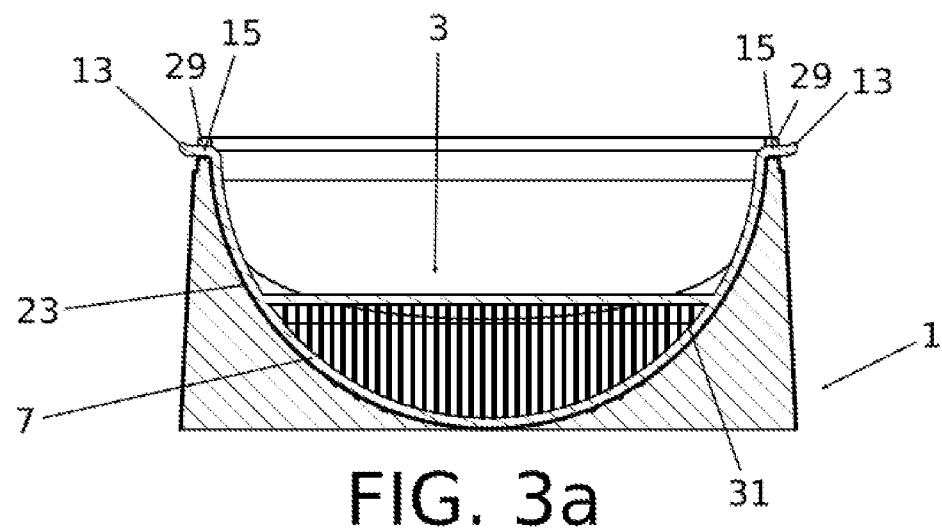
FIG. 3a depicts a cross sectional view of FIG. 3 along line A-A. Line A-A is a rotational axis through a pivot point a scoop device is inserted into.
Figure 3:
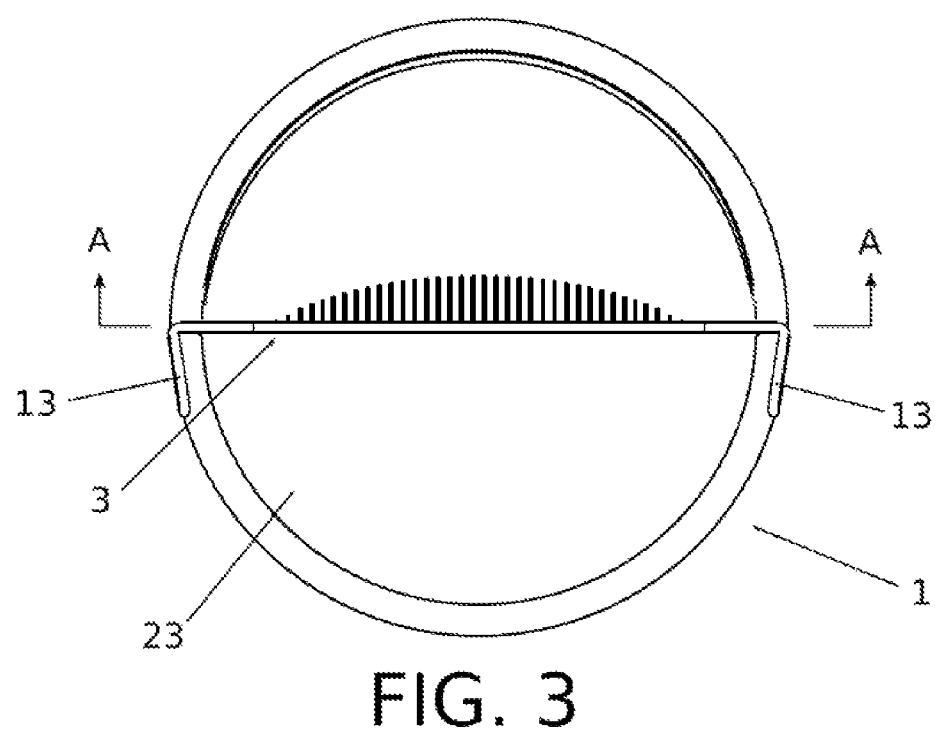
FIG. 3 depicts a top view of one embodiment of a litter receptacle with a scoop device pivotally inserted into a base container.

FIG. 3 shows a top view of the base container 1 with the scoop device 3 pivotally inserted into the base container 1.

FIG. 3A is a cross section of FIG. 3 through the rotation axis x-x' described in the paragraph above. A portion of the inner surface 23 supports a bed of litter granules 31. The scooping profile 7 features a matching contour to the portion of inner surface 23 that holds said bed of litter granules 31. The hinges 15 of the scoop device 3 are resting in the pivot slots 29 of the base container 1. The hinges 15 are adapted on the scoop device 3 such that when handles 13 are rotated, the movement is transferred to the scoop profile 7 which describes an arc parallel to the inner surface 23.

Figure 4A:
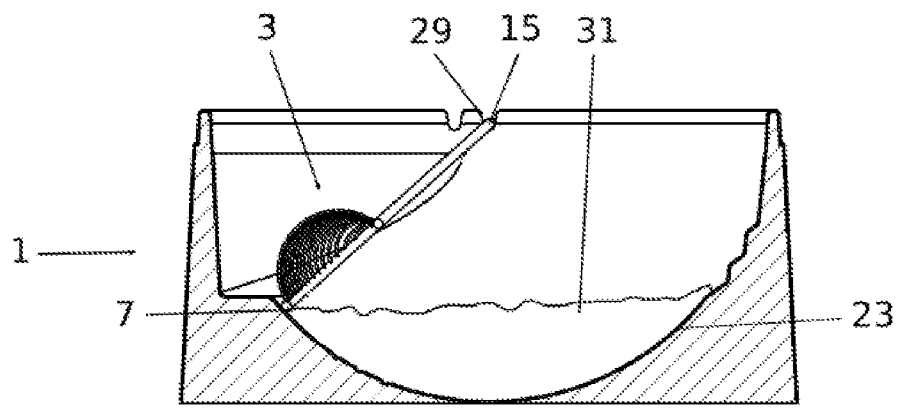
Figure 4:
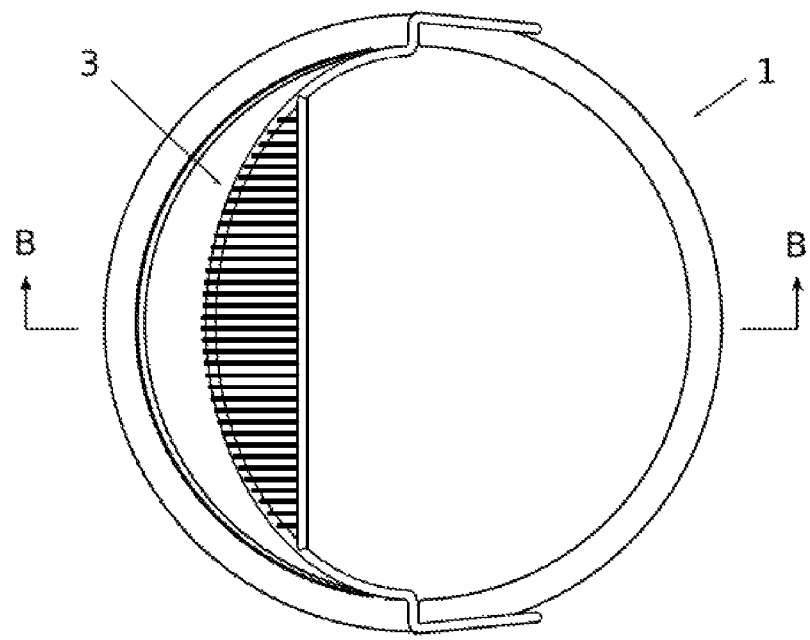
FIGS. 4-8 depicts top views illustrating the operation of one embodiment of the litter receptacle. The scoop device is being rotated through a base container and then lifted from said base container.
Figure 5A:
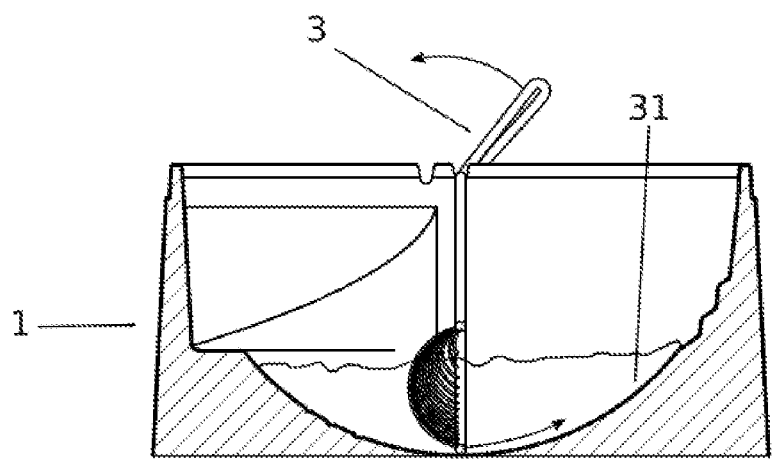
Figure 5:
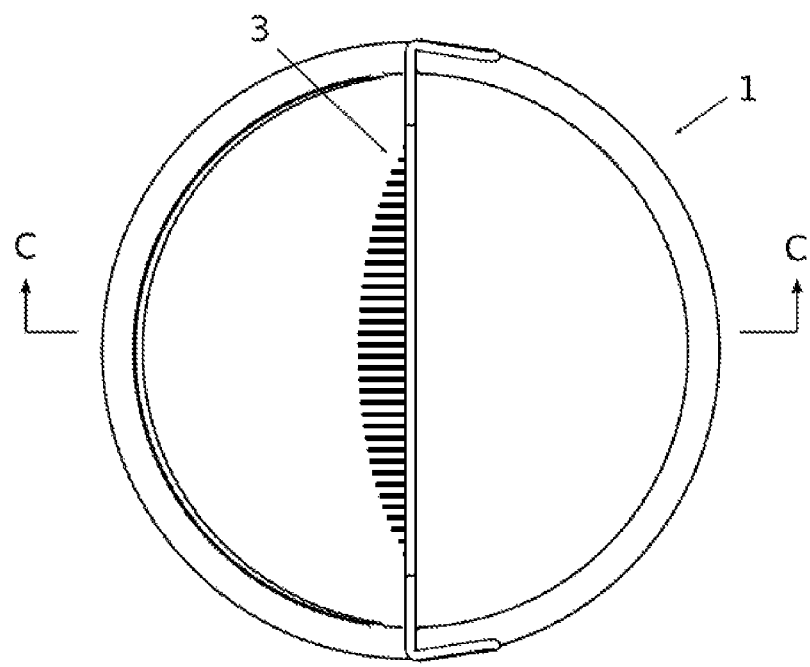
Figure 6A:
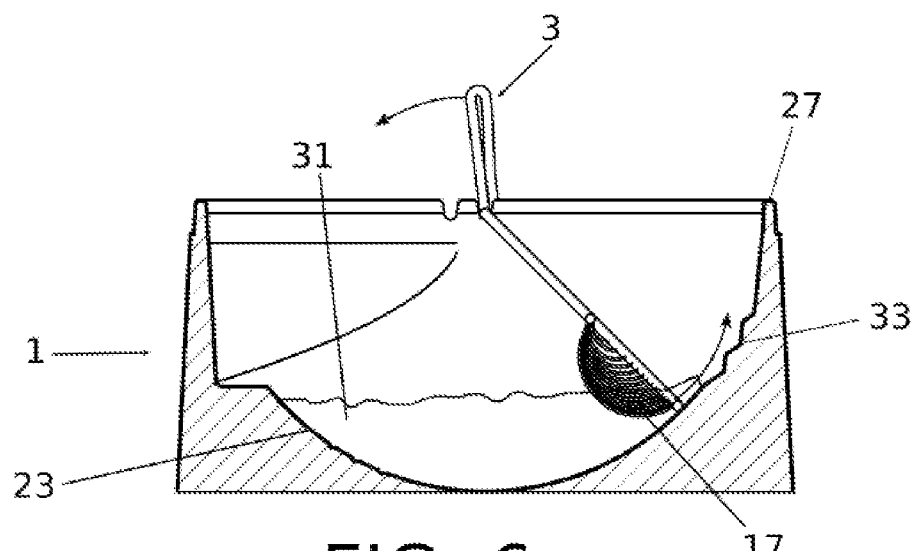
Figure 6:
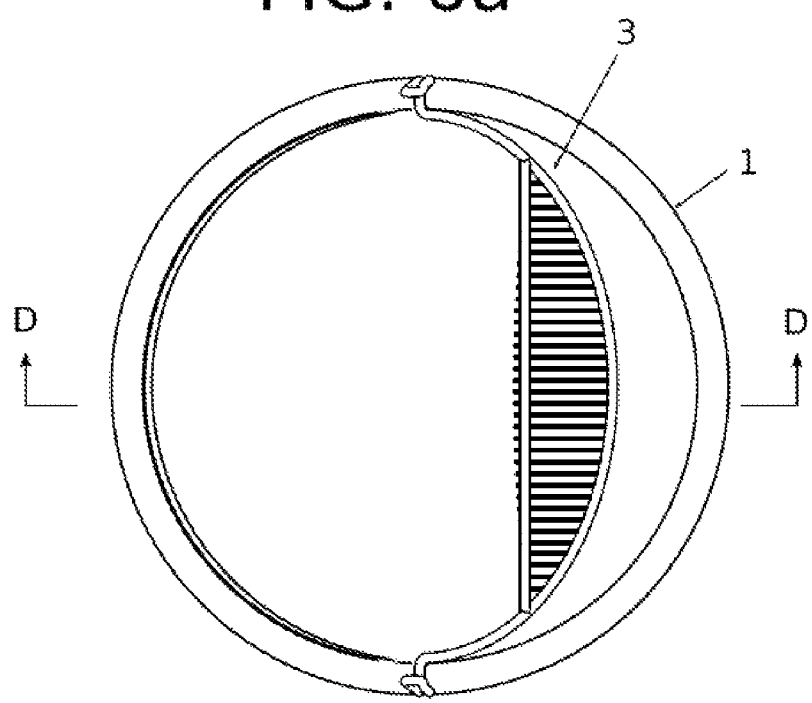

The operation of the above described embodiment is illustrated in FIGS. 4-8 and their respective cross sections 4a-8a. Referring to FIG. 4A, a cross sectional view of FIG. 4 is shown. A portion of the inner surface 23 of the base container 1 is holding the bed of litter granules 31. The hinges 15 of scooping device 3 are resting in the pivot slots 29 and the scooping profile 7 is making contact with the bed of litter granules 31. This is a starting position for a scooping cycle, where the scoop device 3 will be rotated through the litter bed 31, separating any waste excreta from the bed of litter granules 31. In FIG. 5b the scoop device 3, is in motion and has been rotated by manual force 45 degrees to a point where said scoop device 3 has traversed half the bed of litter granules 31. In FIG. 6a, the scoop device 3 has been rotated 90 degrees relative to starting position of the scooping cycle. In this position scoop device 3 has now traversed through the bed of litter granules 31, whereby said sifting grate 17 will have separated foreign matter from the bed of litter granules 31. There are a plurality of litter materials that are suitable for use in this embodiment and it is normal for lighter litter materials to form a wave in front of the scoop device 3 during rotation and subsequently climb up the inner surface 23 in the rotational direction. In FIG. 6a, a series of indentures 33 are shaped into the base containers 1 inner surface 23. These indentures 33 provide resistance to keep litter from pushing in a wave upwards along the inner surface 23 towards the base containers top edge 27. This resistance facilitates the scoop device 3 in effectively sifting through litter. In other embodiments a resistance element can be created in numerous other ways, for example, with a textured surface or simply steeper and taller interior walls would provide such resistivity and facilitate in keeping the bed of litter granules 31 from excessively moving upwards along said inner surface.

Figure 7A:
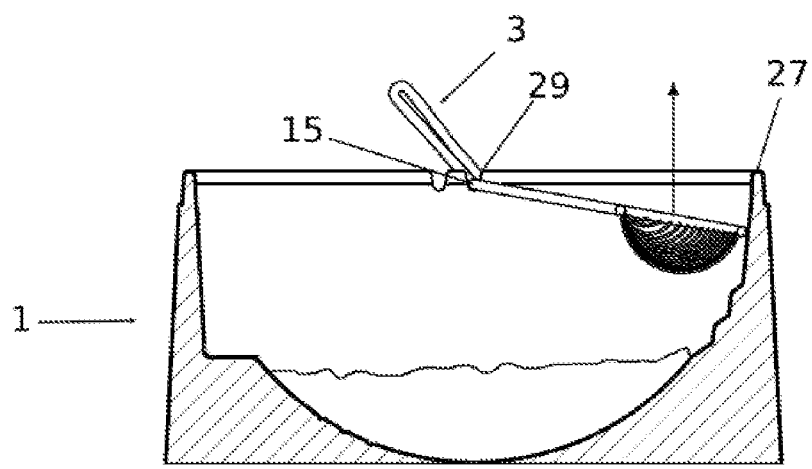
Figure 7:
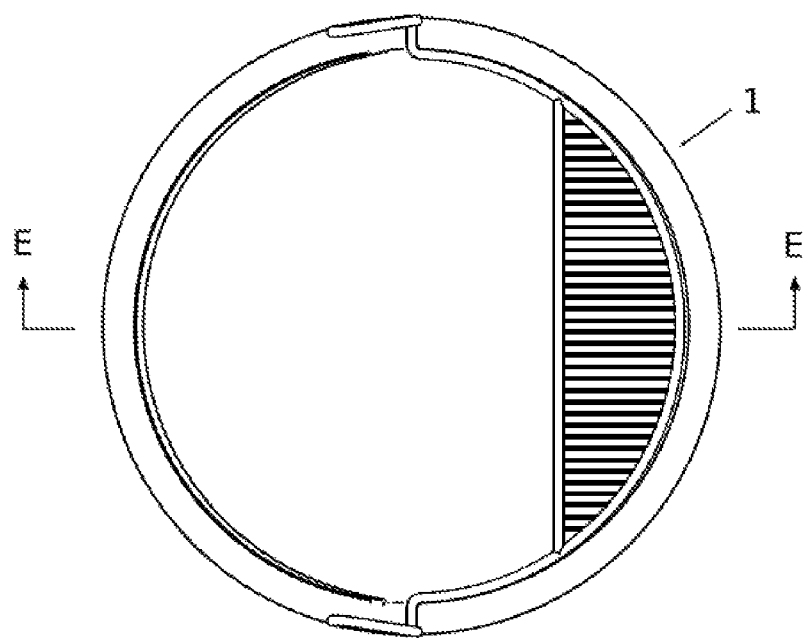
Figure 8A:
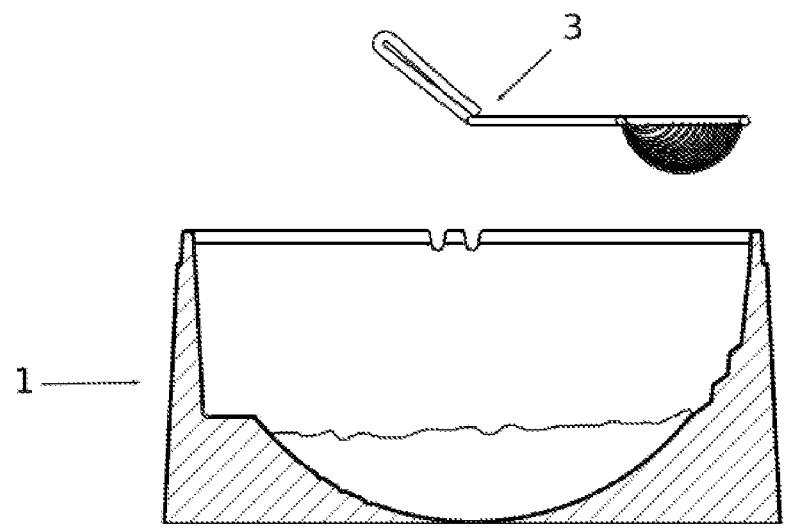
Figure 8:
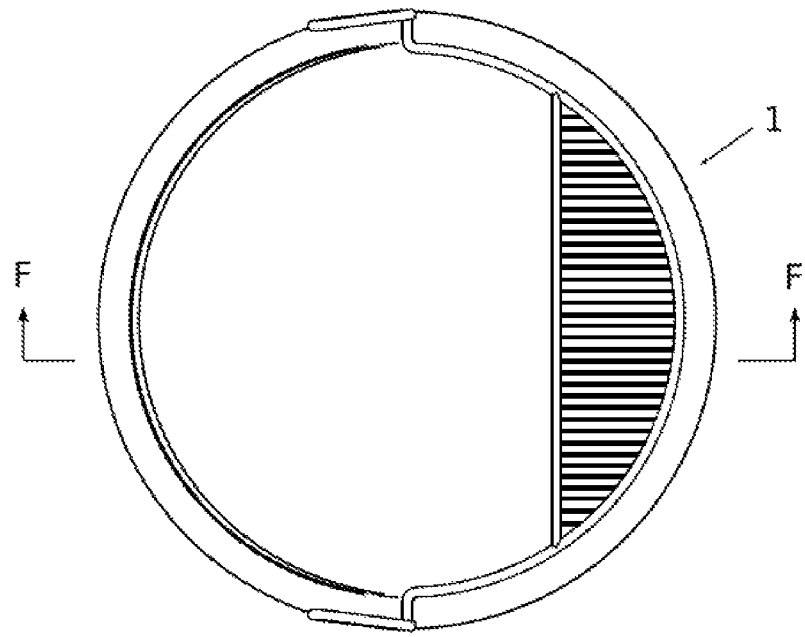

FIG. 7a illustrates the operation of the scoop device 3 nearing the containers top edge 27. It is important to note that the scoop device 3 is not mechanically attached to the base container 1 and therefore is able to be lifted out of the base container 1 at any point during the scooping cycle. This is important because the scoop device 3 should be lifted from the base container 1 before the scooping profile 7 reaches the base containers top edge 27, otherwise litter could spill over the edge onto the floor. To remove the scoop device 3 the user lifts the scoop device 3 upwards allowing the hinges 15 to lift from the open pivot slots 29. FIG. 8A shows the scoop device 3 lifted from the base container 1.

Figure 9A:
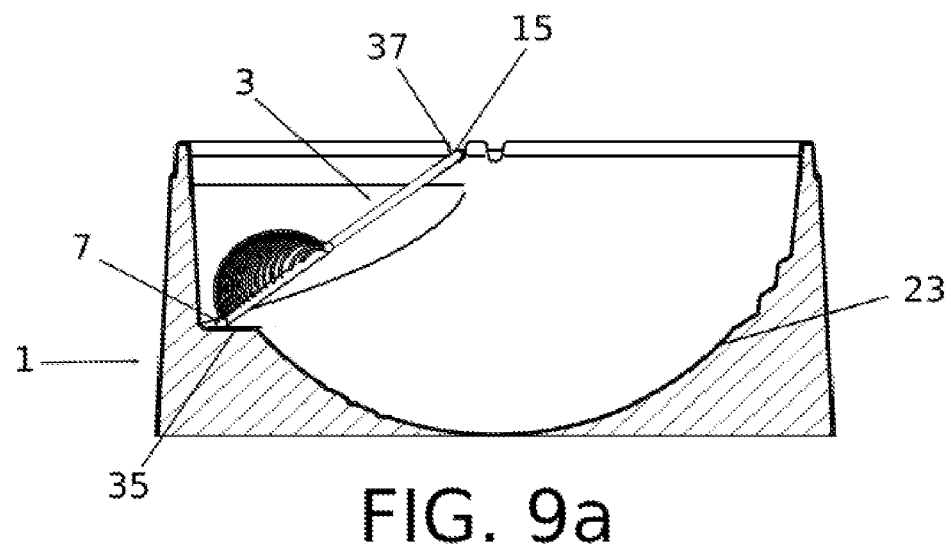
FIG. 9a depicts a cross sectional view of FIG. 9 along line G-G.
Figure 9:
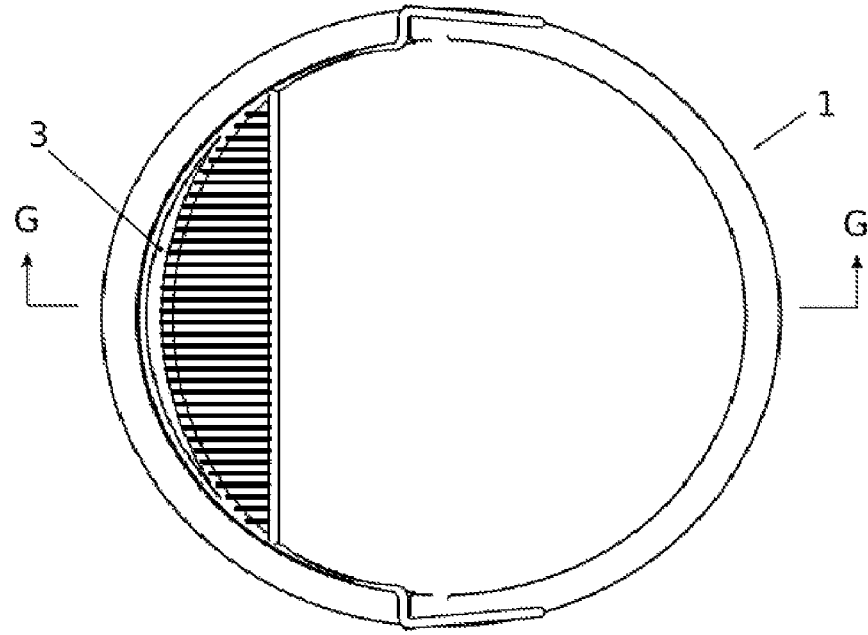
FIG. 9 depicts a top view which illustrates how a scoop device can be stored inside a base container.
Figure 9B:
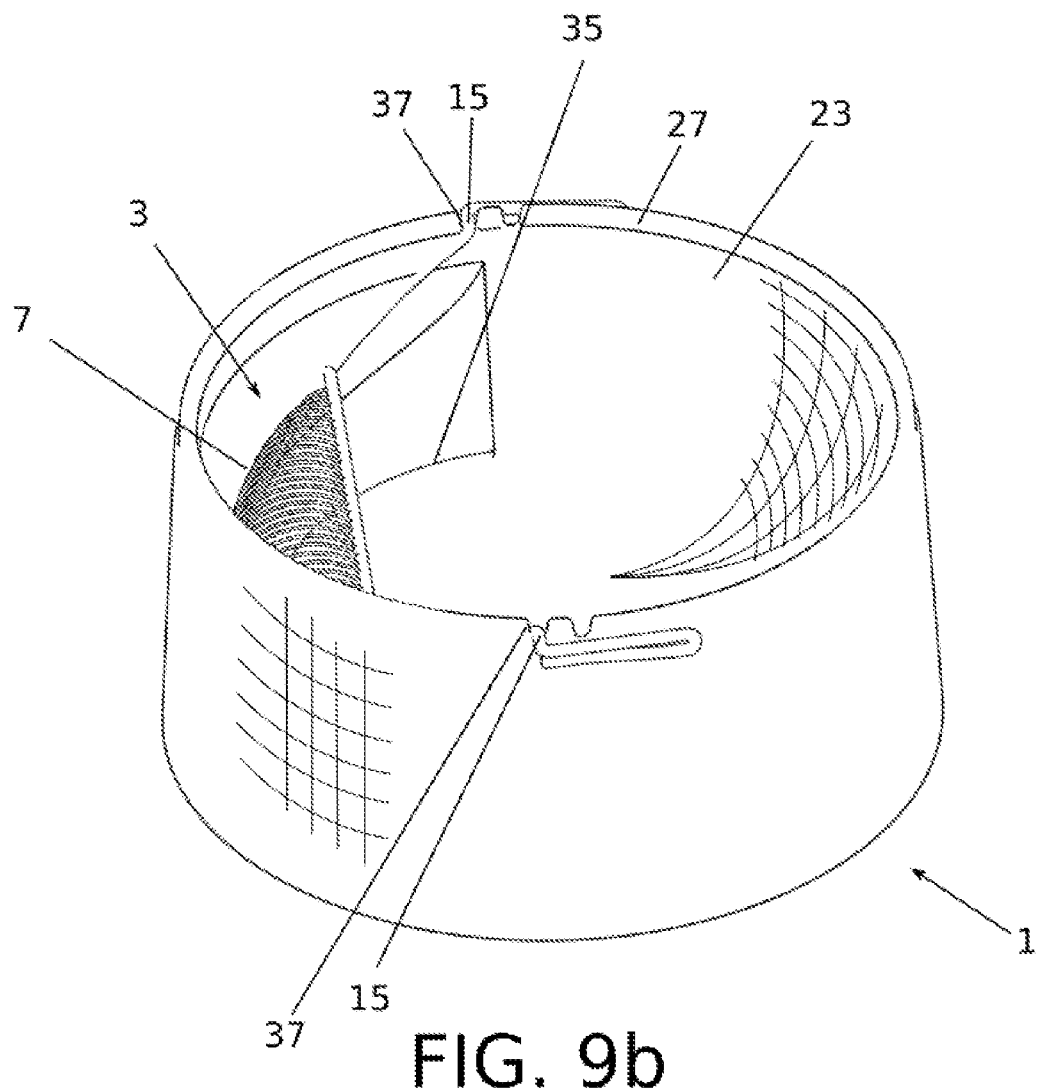
FIG. 9b depicts a perspective view of the same configuration in FIG. 9 of said base container with said scoop device stored inside.

As an added feature to this embodiment, the scoop device 3 can be stored inside the base container 1 as illustrated in FIG. 9a. A storage ledge 35 is indented into the base containers inner surface 23 such that the scooping profile 7 can rest on said storage ledge 35. Further, two storage slots 37 are positioned on the top edge 27 of the base container 1. The hinges 15 can be rested in said storage slots 37 with the scooping profile 7 resting on the storage ledge 35. This configuration will lock the scoop device 3 from rotating inside the base container 1. FIG. 9b depicts a perspective view of the scoop device 3 tidily stored inside the container 1.

Figure 10:
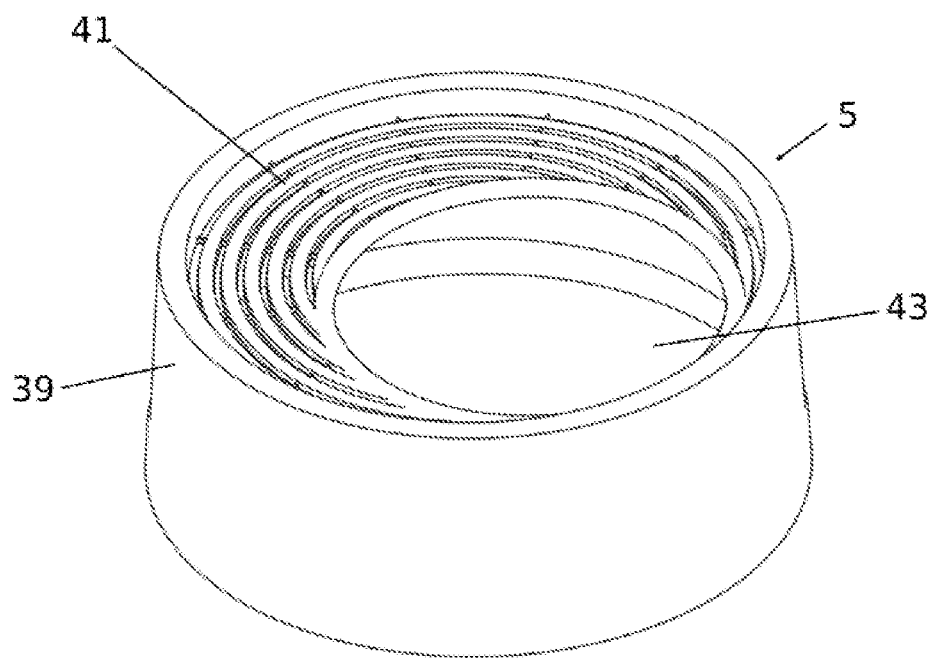
FIG. 10 depicts a perspective view of a top cover.

Referring to FIG. 10 a top cover 5 is illustrated for the above described embodiment. The top cover 5 is comprised of cylindrical side walls 39, a roof membrane 41, and an ingress-egress opening 43. In FIG. 11 the first embodiment is illustrated with base container 1, scoop device 3, and top cover 5 assembled creating a compact, tidy, and modern appearance as well as helping contain litter and odor within the litter receptacle. The base container has an indented ridge 45 and the cover 5 is adapted so it securely rests on this indented ridge 45.

Figure 12A:
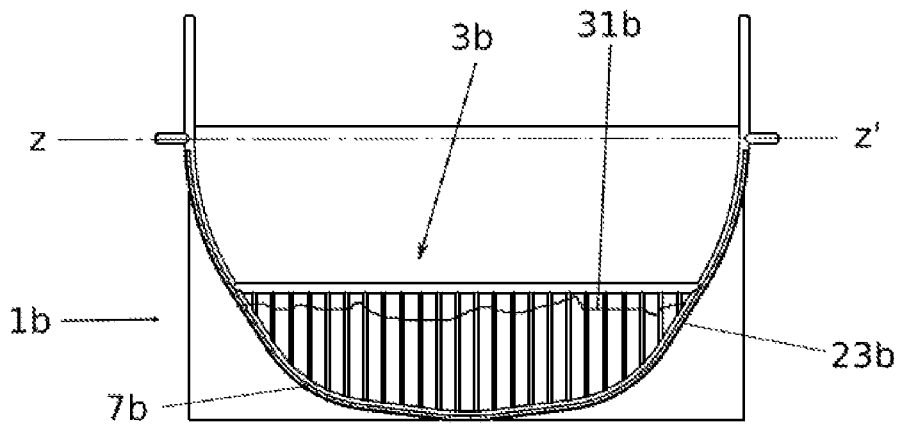
FIG. 12A depicts a cross sectional view of FIG. 12 along line H-H.
Figure 12:
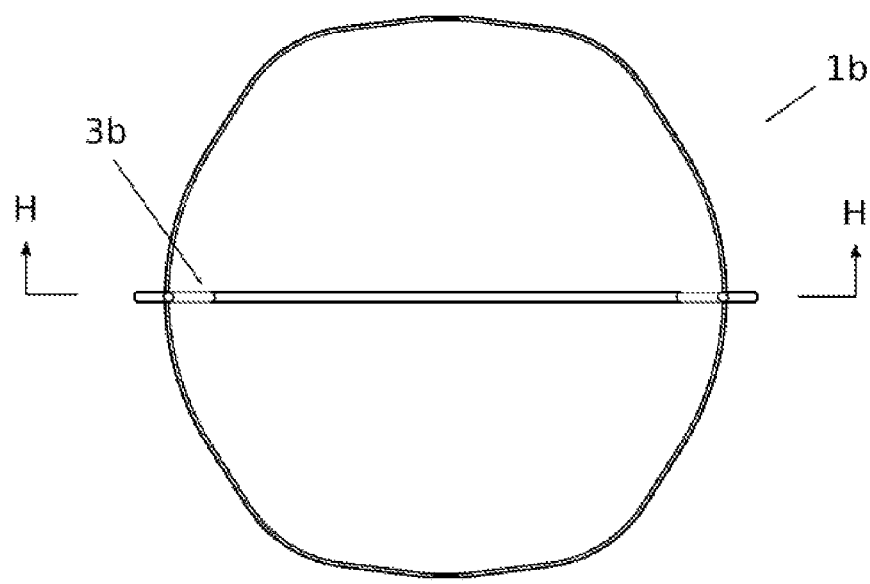
FIG. 12 depicts a top view of another embodiment of the litter receptacle with a scoop device pivotally inserted into a base container.
Figure 13:
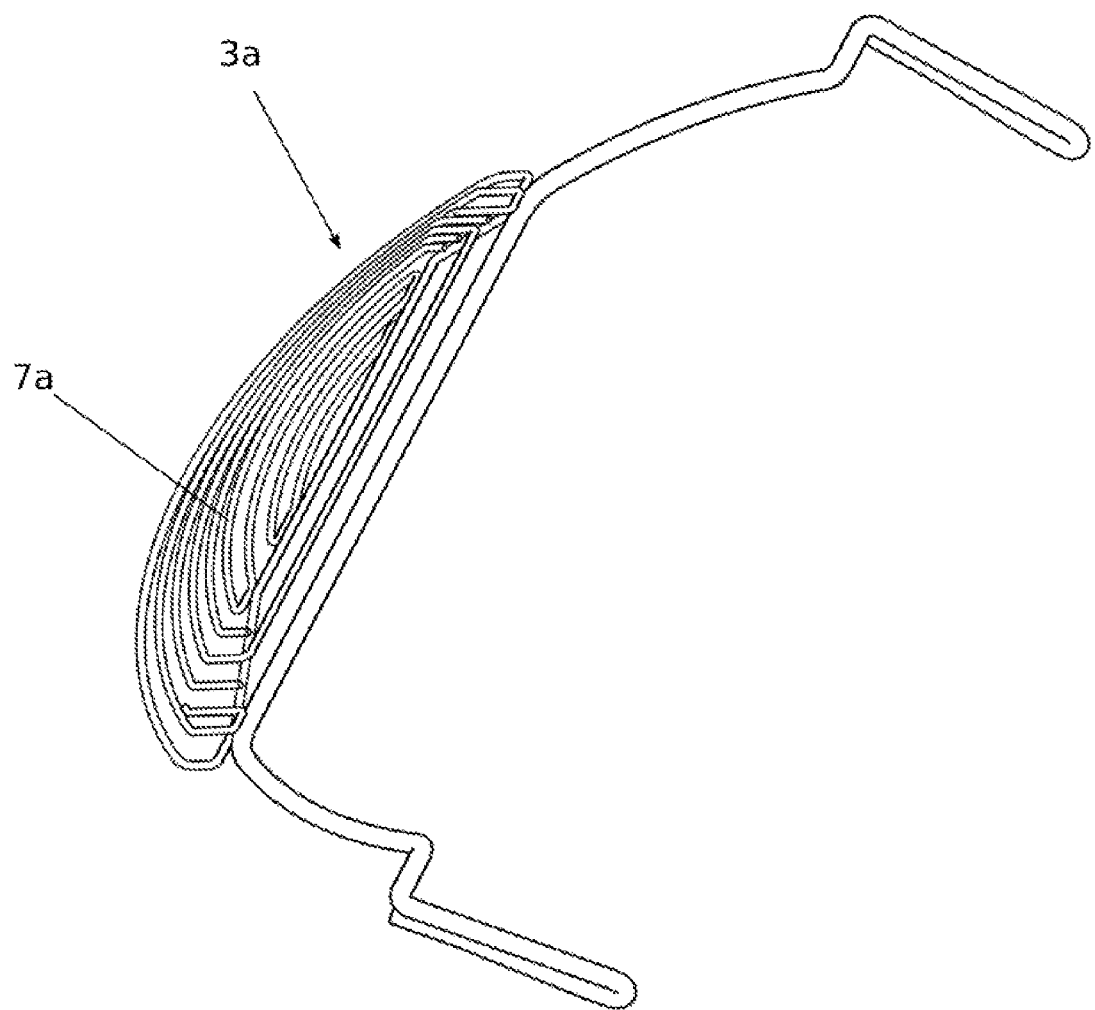
FIG. 13 depicts a perspective view of another embodiment of a scoop device.

Another embodiment of the litter receptacle is shown in FIG. 12. This embodiment is similar to the above described embodiment, with the following differences: the scooping frame 7b is formed from varying curvatures, whereas the scooping profile 7 from the embodiment in FIG. 1 has a uniform curvature. Further, in the first described embodiment, the inner surface 23 was substantially hemispherical in shape. In this embodiment the inner surface 23b is contoured to match the scooping profile 7b; the inner surface 23b is adapted so it remains contoured to the scoop profile 7b relative to a fixed rotational z-z' axis. The inner surface 23b holds a bed of litter 31b and the scooping profile 7b can be a plurality of shapes as long as the portion of inner surface 23b that holds the bed of litter granules substantially contours said scoop profile 7b. In other words, the scooping profile 7b and a matching portion of the inner surface 23b are adapted such that the scooping profile 7b remains substantially complimentary in curvature to each other, as the scoop device 3b is rotated along a rotational axis inside the base container 1b. Another embodiment of a scoop device 3a is shown in FIG. 13. This embodiment is similar to the scoop device 3 in FIG. 1 except a sifting grate 17a is formed much differently than sifting grate 17 from FIG. 1.

Figure 15:
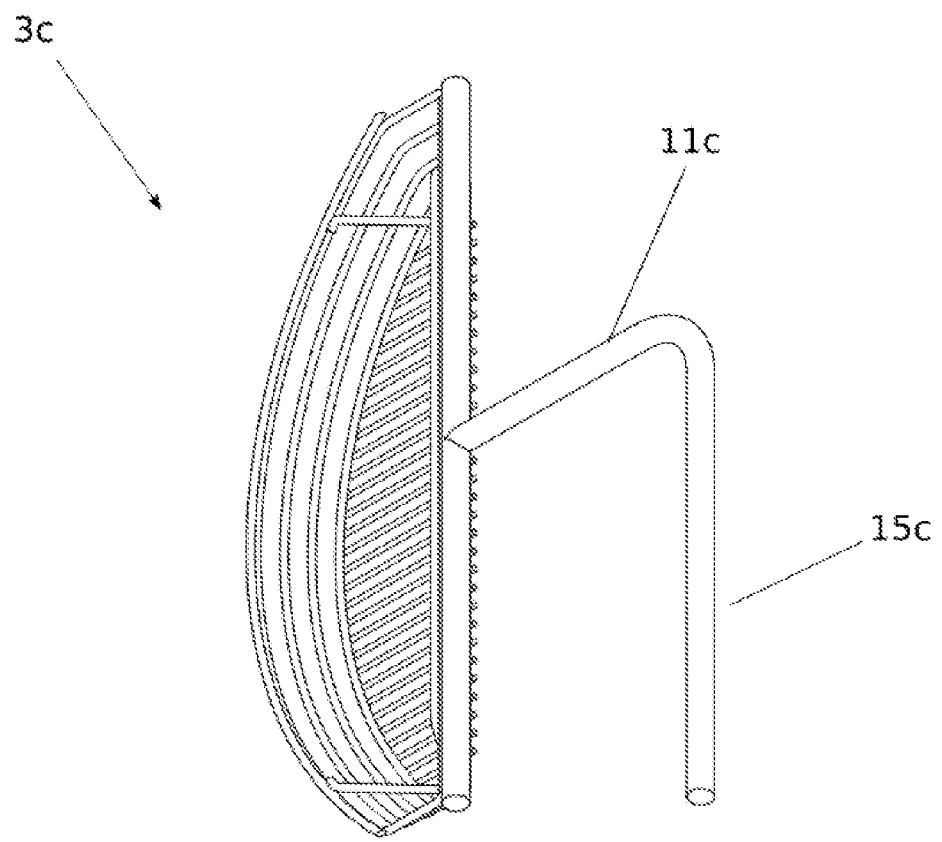
FIG. 15 depicts a perspective view of another embodiment of a scoop device.

In other embodiments the scoop device could be formed in a plurality of differently ways; for example, in FIG. 15 a scoop device 3c is configured without handles and just a singular hinge 15c and singular radial arm 11c. The scoop device would be rotated and lifted from the radial arm 11c or hinge 15c. Further, the sifting grate can be formed from a variety of materials and in a variety of configurations; for example, it could be constructed from mesh or netting.

From the above description, a number of advantages of my litter scooping receptacle will become evident. The litter is able to be fully sifted in one pass, and the scoop device removed from the base container without the user touching any component that has be in contact with used litter. It is also noteworthy that these embodiment's have a mechanism described for attaching and detaching the scoop device from base unit with minimal hardware, the open pivot slots 29 (FIG. 2). This provides a great benefit for the user, as they can simply lift the scoop device from the base without having to fumble and manually detach the scoop device containing waste excreta, the scoop device can be rotated through the litter mass and lifted out of the base container in one motion, without ever having to traverse back to the starting position. Further, the design allows for the scoop device to be stored inside the litter receptacle when not in operation which creates a tidy compact design. Also, the above mentioned embodiment's allow a top cover to be added to the base container; this is desirable in litter and odor containment, and because the unit can be used with or without the top cover, a feline can slowly be introduced to the covered litter system without any stressful and sudden transition.

Figure 14:
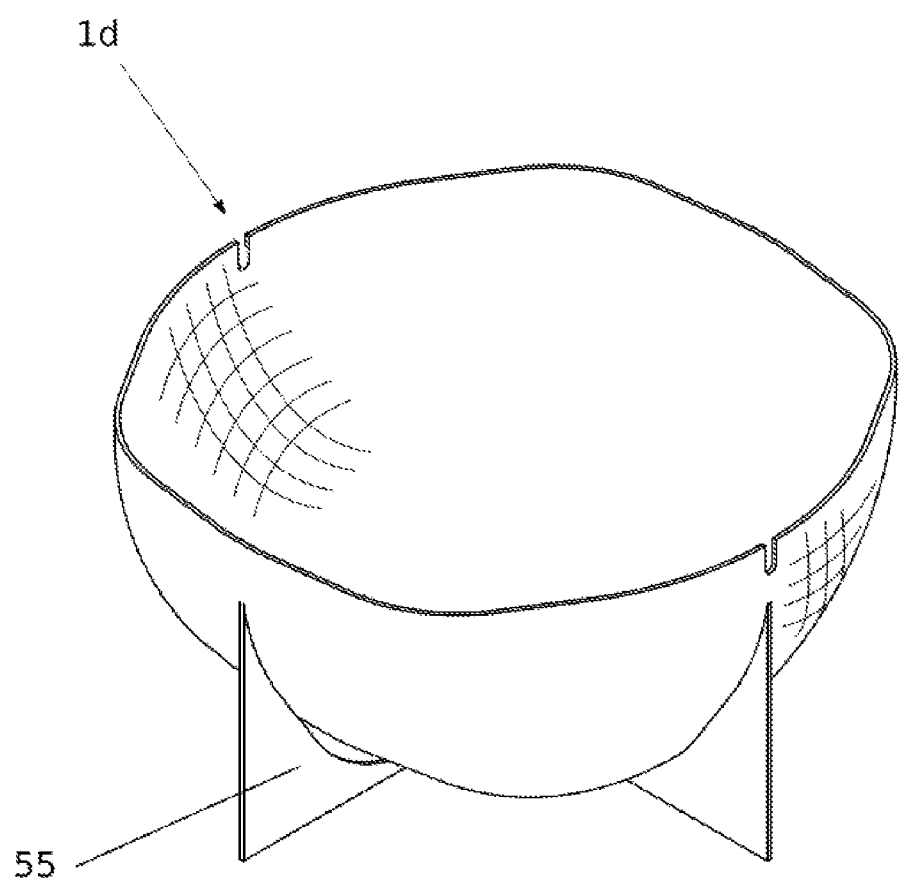
FIG. 14 depicts a perspective view of another embodiment of a base container.

The description above describes multiple embodiments of the litter receptacle in details with many specificities. These specificities are provided to clearly illustrate some of the embodiments but the scope of these embodiments is not limited to these specificities. For example, the base container could feature outer walls that differ in shape from cylindrical, for instance the outer walls could be a plurality of shapes such as oval or rectangular or, as depicted in FIG. 14, the outer wall could simply be a stand 55 that supports the inner surface; the pivot slots could be formed in a plurality of ways so long as they facilitate in positioning the scoop device accurately along a defined axis and allow the scoop device to be inserted and removed with ease; the cover could be secured to the base container differently such as using a latch, overlapping interference fit, or a plethora of other configurations. How it attaches to the base container is trivial.

For these reasons, the scope of the above described embodiments should be determined by the appended claims, instead of the examples given. Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A litter scooping receptacle comprising:
   a base container having an inner surface configured to retain a bed of litter granules;
   the base container includes a top perimeter edge having a pair of pivot slots, wherein the pivot slots are upwardly open to an environment;
   a removable scooping device hingingly engaged with the pivot slots, the removable scooping device having a sifting grate conforming to the inner surface such that upon rotation of the removable scooping device through the bed of litter granules, the sifting grate is configured to retain sifted waste material; and,
   the removable scooping device configured to be separated from the pivot slots for disposing the retained sifted waste material from the sifting grate.

2. The litter scooping receptacle of claim 1, wherein the removable scooping device includes a pair of handles configured to facilitate the rotation of the removable scooping device by a user.

3. The litter scooping receptacle of claim 1, wherein the base container has a substantially cylindrical outer wall and the inner surface has a concave hemispherical shape.

4. The litter scooping receptacle of claim 3, wherein the sifting grate has a convex profile conforming to the concave hemispherical shape.

5. The litter scooping receptacle of claim 1, wherein the base container is upwardly open to an environment.

6. The litter scooping receptacle of claim 5, further comprising an enclosure cover having a singular ingress and egress opening, wherein the enclosure cover is mountable to the base container.

7. The litter scooping receptacle of claim 1, further comprising a pair of storage slots configured to engage the pair of hinges such that the removable scooping device is stored in a fixed position.

8. The litter scooping receptacle of claim 1, wherein the inner surface includes a series of indentures providing upwardly resistance to litter granules of the bed of litter granules while the removable scooping device rotates through the bed of litter granules such that the litter granules are retained in base container after sifting.

9. The litter scooping receptacle of claim 1, wherein the sifting grate is comprised of a plurality of tines arranged in a pattern enabling litter granules of the bed of litter granules to pass through the sifting grate while restricting waste material.

10. The litter scooping receptacle of claim 1, wherein at least a portion of the inner surface has a concave shape that is a defined locus relative to a defined rotational axis.

11. The litter scooping receptacle of claim 10, wherein the sifting grate has a convex profile conforming to the concave shape.

* * * * *